Aug. 7, 1928.
A. F. JENKINS
1,679,826
FLUID PRESSURE REGULATOR
Filed Nov. 8, 1923
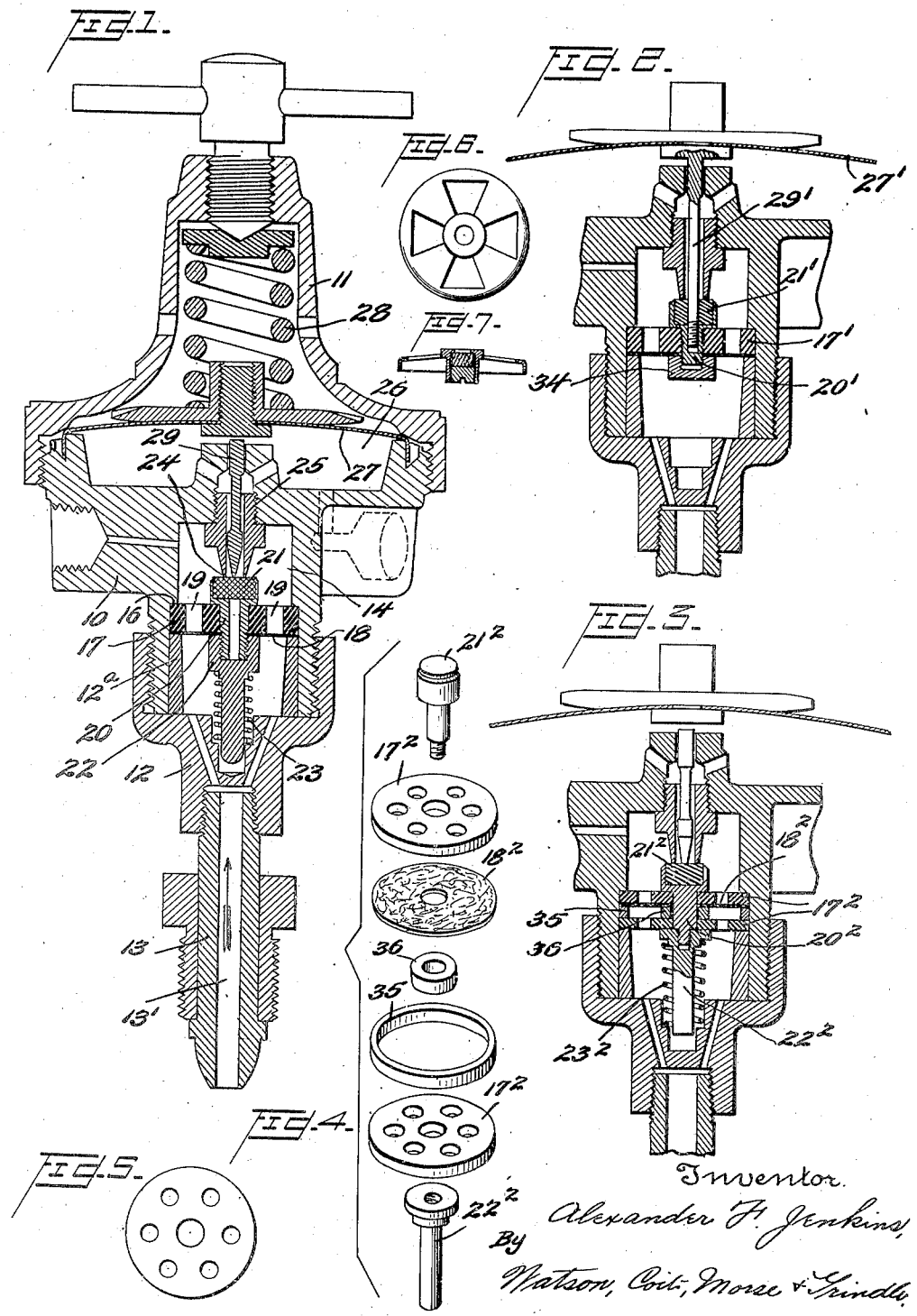
Inventor.
Alexander F. Jenkins,
By Watson, Coit, Morse & Grindle
Attorneys Patented Aug. 7, 1928.

1,679,826

UNITED STATES PATENT OFFICE.

ALEXANDER FREDERICK JENKINS, OF BALTIMORE, MARYLAND.

FLUID-PRESSURE REGULATOR.

Application filed November 8, 1923. Serial No. 673,614.

The present invention relates to fluid pressure regulators and particularly to devices for regulating the flow of gas from high pressure containers, such as oxygen or acetylene gas flasks for storing and transporting gas for oxyacetylene welding or cutting operations.

In my co-pending application Serial No. 372,408, filed April 9, 1920, is disclosed and claimed a pressure regulator of this type, and the present invention constitutes an improvement upon the regulator disclosed in that application. My improved regulator has a number of features of novelty which render it simpler in construction, less expensive to manufacture, more positive and sensitive in operation, and less liable to become obstructed by dirt or impurities in the gas which flows through the same. The moving parts of my present regulator are so supported that friction is practically eliminated, there being no metallic bearing surfaces, the friction between which can be greatly increased by the deposition thereon of substances carried by the gas in the nature of impurities.

There are a number of different constructions in which the principles of the invention may be embodied, and in the accompanying drawings three such forms are illustrated by way of example.

Figure 1 is a longitudinal sectional view through a regulator having one form of the improved mechanism incorporated therein.

Figure 2 is a partial section through a similar regulator but which has a different detailed construction.

Figure 3 is a sectional view similar to Figure 2 through a second modified form of the invention.

Figure 4 is a disassembled view of certain of the elements shown in assembled relation in Figure 3.

Figure 5 is a plan view of a detail.

Figure 6 is a plan view of a modified form of valve supporting member, and

Figure 7 is an axial section through the same.

The regulator body comprises essentially three portions, a central portion 10, the upper dome-like portion 11, and the lower portion or coupling member 12 to which tubular member 13, having the inlet conduit 13' for the gas, is secured. Formed in the member 10 is a cylindrical chamber 14 which constitutes a portion of the gas channel through the regulator, being in communication with the inlet conduit 13'.

Chamber 14 is formed with a downwardly facing annular shoulder 16, and between this shoulder and the annular upper edge of a sleeve 12ª inserted within the chamber and held therein by means of a member 12, is a flexible disk 17, preferably of rubber, and a felt disk 18. The rubber disk is provided with a plurality of equi-distantly spaced gas passages 19 and is provided with a central aperture through which projects a spindle-like member 20 having a cup-shaped recess in its upper end in which is secured the hard rubber valve member 21, and having its lower end exteriorly threaded to receive the interiorly threaded spindle 22 which extends downwardly axially of the gas chamber 14. A coiled compression spring 23 normally tends to force spindle 22 upwardly and hence to flex the rubber diaphragm upwardly to press the valve 21 against an annular valve seat 24 formed on the lower end of a short tube 25 threaded into a passage extending through the top wall of gas chamber 14.

When the valve 21 is displaced from its seat gas may flow from chamber 14 upwardly into chamber 26, which is formed in the upper surface of the central portion 10 of the regulator, this chamber being closed by a flexible diaphragm 27. From the chamber 26 the gas may flow to a point of distribution, as through the outlet 26' shown in dotted lines in Fig. 1. A spring 28 normally tends to force diaphragm 27 downwardly and hence to unseat valve 21, a movable rod or spindle 29 serving to transmit the movements of the diaphragm to the valve 21. When the pressure in chamber 26 falls below that desired, the action of spring 28 on spindle 29 will cause valve 21 to become unseated (spring 28 overcoming spring 23 and the gas pressure beneath diaphragm 27) and gas under high pressure will flow upwardly through the connecting conduit until the diaphragm 27 is again raised against the action of spring 28, whereupon valve 21 will be again seated.

The rubber disk 17 permits, by its flexure, the valve to move axially of the gas chamber 14 and at the same time causes the valve to be at all times exactly centered in the chamber and with its flat seating surface parallel to the valve seat. There are practically no frictional losses in the valve movements, and the construction is such that the valve will never stick because of friction or clogging of the passages by dirt and impurities deposited from the gas passing through the regulator. This sticking and excessive friction has been a fault of most regulators heretofore designed or suggested.

In Figure 2 a construction is illustrated in which the valve 21' is carried by a flexible rubber disk 17', but the metal member 20' in which the valve is secured is rigidly connected by means of a spindle 29' with the flexible diaphragm 27'. The necessity for using a spring below the diaphragm to press upwardly thereon is therefore avoided.

In Figure 3 it will be seen that two relatively thin rubber diaphragms $17^2$ are utilized, the outer margins of which are held in spaced relation by a metal spacing ring 35, and the central portions of which by a spacing ring 36. A felt pad is indicated at $18^2$. The valve $21^2$ is secured within the upper end of a spindle-like member $20^2$ which extends through bolt disks $17^2$. To the lower end of member $20^2$ an extension $22^2$ is threaded, and a spring $23^2$ normally presses against this member and acts to flex the diaphragms upwardly and to maintain the valve seated, as in the other modifications.

By using the two diaphragms instead of a single diaphragm, as illustrated in Figure 1, greater flexibility is realized and also the alignment of the valve is more perfectly maintained than in the case where a single disk is utilized. In all forms of the device, however, it is found that the movement of the valve is unaccompanied by friction and that there is no possibility of the action of the valve being interfered with because of the sticking of the valve carrying member. A still further advantage consists in the ready accessibility of the parts for cleaning. The valve mechanism may be quickly withdrawn from the casing, cleaned and returned and, if the parts have been made with accuracy, the valve will be exactly coaxial with the valve seat, as before. This is of great importance since the valves tend to score after long use, and unless returned to such position that the valve seat actually registers with and enters the scored circular groove in the valve leakage will result.

Instead of a rubber diaphragm 17 for supporting the valve a metallic diaphragm, such as illustrated in Figures 6 and 7, may be utilized, this diaphragm being cut away to provide passages for gas therethrough and to increase its flexibility. The pads 18 and $18^2$, shown in the drawings constitute filtering elements for removing impurities from the gases passing through the regulator. They may be replaced from time to time.

It will be realized by one skilled in the art that the design and arrangement of the component elements of the invention may be considerably modified without departing from its spirit and scope.

Having thus described my invention what I claim as new and desire to secure by Letters Patent is:

1. In a pressure regulator, in combination, a gas passage having a valve seat, a valve for said seat, pressure controlled valve operating means, a flexible member bridging the gas passage upon which the valve is centrally mounted for movement axially of the valve seat, said member being perforated to permit the flow of gas therethrough, and means associated with said member for filtering the gas passing through said perforations.

2. In a pressure regulator, in combination, a gas passage having a valve seat, a valve for said seat, pressure controlled valve operating means, a flexible member bridging the gas passage upon which the valve is centrally mounted for movement axially of the valve seat, said member being perforated to permit the flow of gas therethrough, and means associated with said member for filtering the gas passing through said perforations, said means comprising a felt strip lying on one side of said member and movable therewith.

3. In a pressure regulator, in combination, a gas passage having a valve seat, a valve for said seat, pressure controlled valve operating means, and means for supporting the valve for movement axially of the valve seat, said means including two disk members having their margins held in fixed spaced relation and their central portions rigidly connected, said disks being flexible to permit movement of the valve under the influence of said valve operating means, said disks also being perforated, and a felt disk interposed between the flexible disks for filtering the gas passing through said perforations.

4. In a pressure regulator, in combination, a gas passage having a valve seat, a valve for said seat, a pair of flexible members supporting the valve as a unit for movement axially of the seat, and spacing means interposed between said flexible members to hold them in slightly spaced relation, said members being unresponsive to gas pressure.

5. In a pressure regulator, in combination, a gas passage having a valve seat, a valve for said seat, a pair of perforated flexible members supporting the valve as a unit for movement axially of the seat, and spacing rings interposed between the margins of said perforated members to hold them in slightly spaced relation.

6. In combination with a fitting having a fluid passage and a valve seat therein, a valve for said seat, a pair of flexible members unresponsive to gas pressure coacting as a unit for supporting said valve for movement axially of said seat, and means for holding said flexible members in slightly spaced relation to prevent disalignment of the valve.

7. In a pressure regulator, in combination, a body, a gas passage therein having a valve seat, a valve for said seat, said valve having an integral extension guided in said body, a pressure controlled means for moving the valve relatively to the seat, and a pair of relatively thick non-metallic flexible members coacting as a unit to support the valve for movement axially of the seat to prevent jamming of said extension, said flexible members being unresponsive to gas pressure.

8. In a pressure regulator, in combination, a gas passage having a valve seat, a valve for said seat, pressure controlled valve operating means, and separate means for supporting the valve for movement axially of the valve seat, said means including a disk having a central aperture through which the valve passes, a collar adjacent said disk, a second disk adjacent said collar, means for securing said disk, collar and second disk on said valve, and means for securing the margins of said disks in fixed spaced relation, said disks being flexible to permit movement of the valve under the influence of said valve operating means, and perforated to permit equalization of pressure therethrough.

ALEXANDER FREDERICK JENKINS.